(12) United States Patent
Mendez

(10) Patent No.: US 7,121,622 B1
(45) Date of Patent: Oct. 17, 2006

(54) SUSPENSION BICYCLE SEAT

(76) Inventor: Raymond F. Mendez, 505 Calle de Valdes, Santa Fe, NM (US) 87505

( * ) Notice: Subject to any disclaimer, the term of this patent is extended or adjusted under 35 U.S.C. 154(b) by 1 day.

(21) Appl. No.: 10/951,876

(22) Filed: Sep. 28, 2004

(51) Int. Cl.
B62J 1/00 (2006.01)

(52) U.S. Cl. .................. 297/201; 297/202; 297/284.11

(58) Field of Classification Search ............ 297/195.1, 297/201, 204, 202, 214, 219.11, 284.11
See application file for complete search history.

(56) References Cited

U.S. PATENT DOCUMENTS

| 415,253 | A | | 11/1889 | Pattisson |
| 507,413 | A | | 10/1893 | Broadbent |
| 569,981 | A | | 10/1896 | Strakosch |
| 575,809 | A | | 1/1897 | Newell |
| 576,192 | A | | 2/1897 | Hoyt |
| 619,179 | A | | 2/1899 | Hunt |
| 620,946 | A | | 3/1899 | Meisselbach, Jr. et al. |
| 661,338 | A | | 11/1900 | Green |
| 694,875 | A | | 3/1902 | Meighan |
| 1,205,241 | A | * | 11/1916 | Mesinger .................... 297/207 |
| 2,395,346 | A | | 2/1946 | Schwinn |
| 3,758,154 | A | * | 9/1973 | Kitaguchi .................... 297/214 |
| 4,099,769 | A | | 7/1978 | Jacobs |
| 4,850,643 | A | | 7/1989 | Rollman |
| 5,048,891 | A | * | 9/1991 | Yach ...................... 297/215.14 |
| 5,203,606 | A | | 4/1993 | Granzotto |
| 5,286,082 | A | * | 2/1994 | Hanson ........................ 297/201 |
| 5,597,202 | A | | 1/1997 | Andersen |
| 5,765,912 | A | | 6/1998 | Bontrager |
| 5,823,618 | A | * | 10/1998 | Fox et al. .................... 297/201 |
| 5,873,626 | A | | 2/1999 | Katz |
| 5,927,802 | A | | 7/1999 | Kesinger |
| 6,079,775 | A | | 6/2000 | Lawson |
| 6,113,184 | A | | 9/2000 | Barnes |
| 6,139,098 | A | * | 10/2000 | Carrillo ........................ 297/202 |
| 6,193,309 | B1 | * | 2/2001 | Gootter et al. ............... 297/202 |
| 6,209,954 | B1 | * | 4/2001 | Bombardier ................. 297/201 |
| 6,231,122 | B1 | * | 5/2001 | Goldstein ................. 297/195.1 |
| 6,244,655 | B1 | | 6/2001 | Minkow et al. |
| 6,422,647 | B1 | * | 7/2002 | Turudich ..................... 297/201 |
| 6,575,529 | B1 | | 6/2003 | Yu |
| 6,666,507 | B1 | | 12/2003 | Ringgard |
| 6,669,283 | B1 | | 12/2003 | Yu |
| 2003/0034678 | A1 | * | 2/2003 | Farre ....................... 297/195.11 |
| 2003/0042770 | A1 | | 3/2003 | Yu |
| 2003/0067195 | A1 | | 4/2003 | Sylvester |
| 2004/0113470 | A1 | * | 6/2004 | Tobias ......................... 297/202 |
| 2005/0006932 | A1 | * | 1/2005 | Laidlaw ....................... 297/201 |

* cited by examiner

Primary Examiner—Peter M. Cuomo
Assistant Examiner—Tania Abraham
(74) Attorney, Agent, or Firm—Vidal A. Oaxaca; Jeffrey D. Myers; Peacock Myers, P.C.

(57) ABSTRACT

The present invention relates to a bicycle seat providing comfort during both leisure and high performance riding. The invention comprises a suspension frame system, an adjustable nose pad, an arcuate seat pad with a center opening, a movable nose pad, and a gap between the nose pad and the seat pad.

18 Claims, 6 Drawing Sheets

SUSPENSION BICYCLE SEAT

BACKGROUND OF THE INVENTION

1. Field of the Invention (Technical Field)

The present invention relates to a bicycle seat providing comfort during both leisure and high performance riding.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Methods and devices for providing comfortable seats and/or seats that do not adversely affect a bicycle rider's health are known. Suspension bicycle seats and seats with cutouts intended to prevent damage to a rider's body, particularly in the groin area, have been designed and marketed. The common approaches to providing comfort and safety in bicycle seats is to soften the padding and/or remove rigid structures from the area where the rider comes into contact with the seat, or to remove the portion of a seat that most often comes into contact with the more delicate portions of a rider's body. Suspension systems such as springs are also employed.

For example, the invention disclosed in U.S. Pat. No. 5,873,626 (to Katz) discloses a ring-shaped, padded seat with no nose or suspension apparatus. U.S. Pat. No. 6,113,184 (to Barnes) discloses a seat with a suspension system and no nose. U.S. Pat. No. 620,946 (to Meisselbach) discloses a seat with a resilient frame and a movable nose. U.S. Pat. No. 5,203,606 (to Granzotto) discloses a fairly conventional seat with a nose that is movable at a downward angle. U.S. Pat. No. 575,509 (to Newell) discloses a ring-like and spring-like seat frame with no nose.

The typical approaches to designing a comfortable, safe saddle are often suited for leisure bicycle riding but offer no advantage, and are often a hindrance, to high performance riding. Typical designs used for high performance riding, on the other hand, provide little comfort. There is a need for a suspension bicycle seat that is well suited for both leisure bicycle riding and high performance riding that can provide enhanced comfort without detracting from high performance efficiency.

BRIEF SUMMARY OF THE INVENTION

The present invention comprises a bicycle seat with a seat post comprising a primary support frame attachable to the seat post, a secondary suspension frame attached from a front end to the primary support frame, a seat pad disposed on the secondary suspension frame and comprising an arcuate shape with a center opening, and a nose pad disposed on the primary support frame forward of the seat pad, the nose pad being adjustably movable forward and rearward.

The primary support frame preferably comprises at least two frame rails oriented substantially parallel to each other, and preferably comprises a support frame shaft attached from one end to a first of the rails and from an opposite end to a second of the rails and providing a point of attachment for the secondary suspension frame to the primary support frame.

The secondary suspension frame is preferably pivotally attached from a front end to the primary support frame and preferably comprises at least one suspension bar.

Preferably, at least one suspension component is disposed at one end on the secondary suspension frame and disposed on the primary support frame at an opposite end so that the suspension component(s) suspends the secondary suspension frame above the primary support frame. The suspension component preferably includes, but is not limited to, the following: a spring, a strut, an elastomer, a cushion, a hydraulic damper, a gas damper, an air damper, and a combination thereof.

The nose pad is preferably disposed on the primary support frame so that a gap is formed between the nose pad and the seat pad. The nose pad is preferably adjustably horizontally movable forward and rearward. The nose pad preferably comprises a concave surface and preferably comprises a U-shaped rear end.

The seat preferably comprises a center nose rail disposed in parallel orientation to, and between, the frame rails, the nose rail providing a point of attachment for the nose pad and a platform upon which the nose pad is movable forward and rearward. The seat also preferably comprises a nose pad rail fixed to an underside of the nose pad that is attachable to the nose rail. The nose pad is preferably easily removable from said nose rail.

The nose pad rail preferably comprises a depressible insert and the nose rail preferably comprises at least two detents to receive the depressible insert as the nose pad is adjustably moved forward and rearward.

The secondary suspension frame may be integral to the seat pad. The seat may comprise a flexible material spanning the center opening, and the flexible material preferably comprises a plurality of interwoven strips. The flexible material may comprise a material including, but not limited to, vinyl, leather, nylon, Kevlar®, and combinations thereof.

A primary object of the present invention is to provide a safer and more comfortable bicycle seat.

A primary advantage of the present invention is that it provides a stable suspension system for a bicycle seat.

Another advantage of the present invention is that the adjustable nose enhances comfort to a rider while providing riding stability to the rider.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into, and form a part of, the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention relates to a bicycle seat comprising a suspension frame and an adjustable nose pad.

Figure 1:
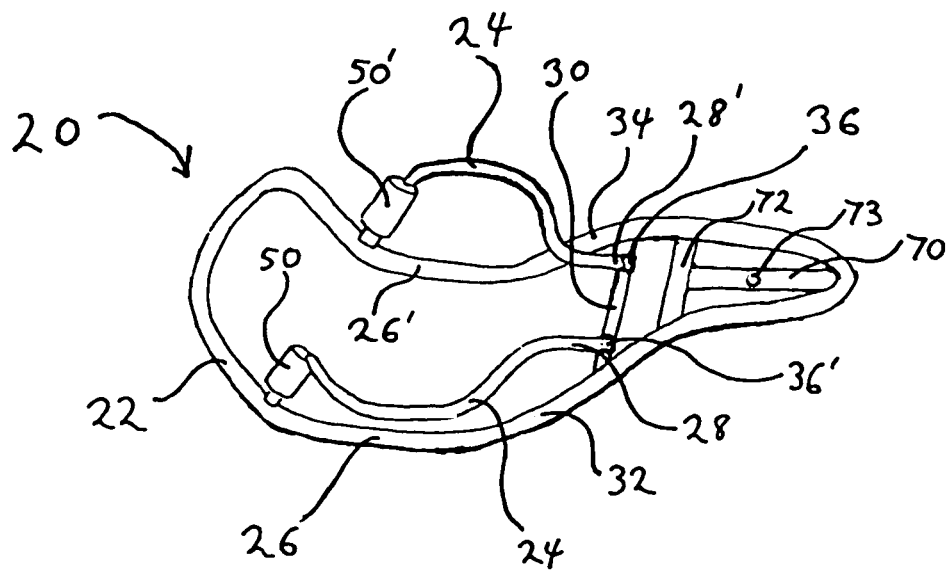
FIG. 1 is a top perspective view of the frame system of the preferred embodiment of the present invention.
Figure 2:
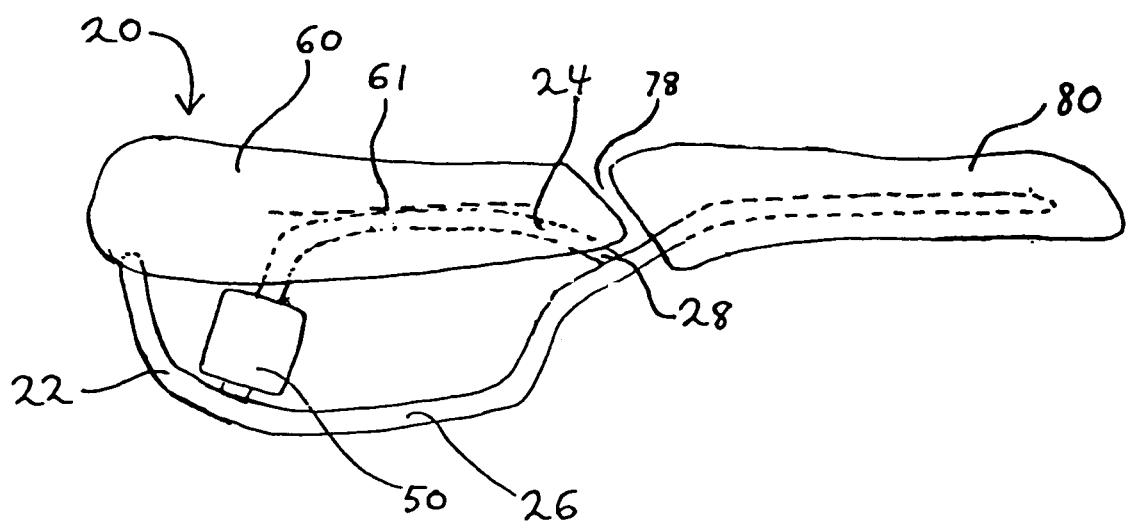
FIG. 2 is a side view of the embodiment of FIG. 1.
Figure 3:
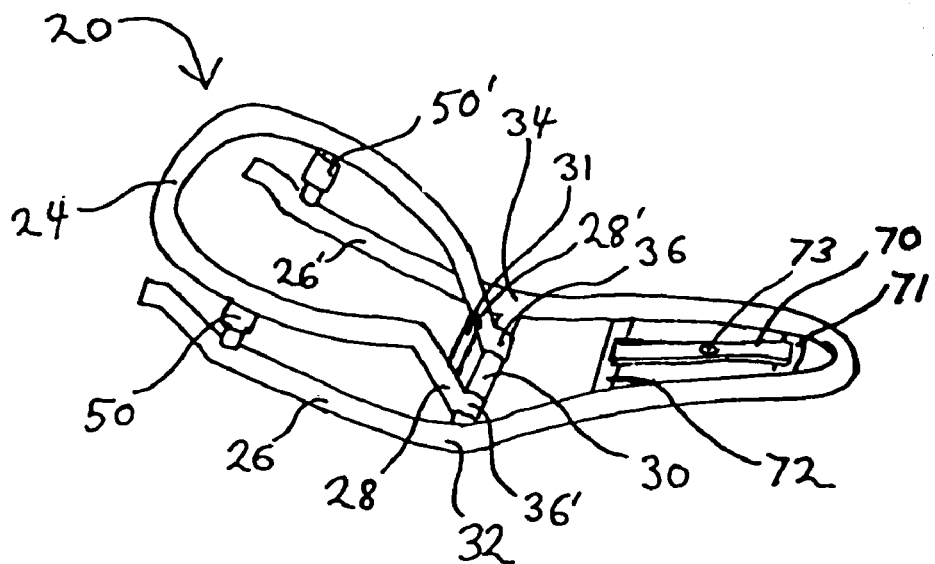
FIG. 3 is a top perspective view of the frame system of another embodiment of the present invention.
Figure 4:
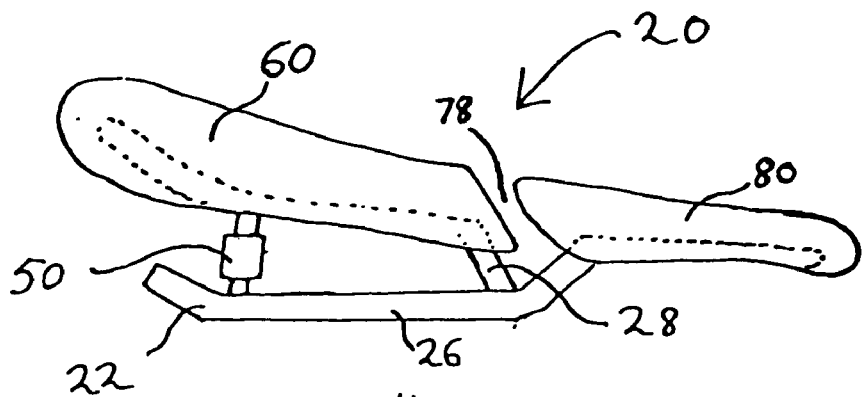
FIG. 4 is a side view of the embodiment of FIG. 3.
Figure 5:
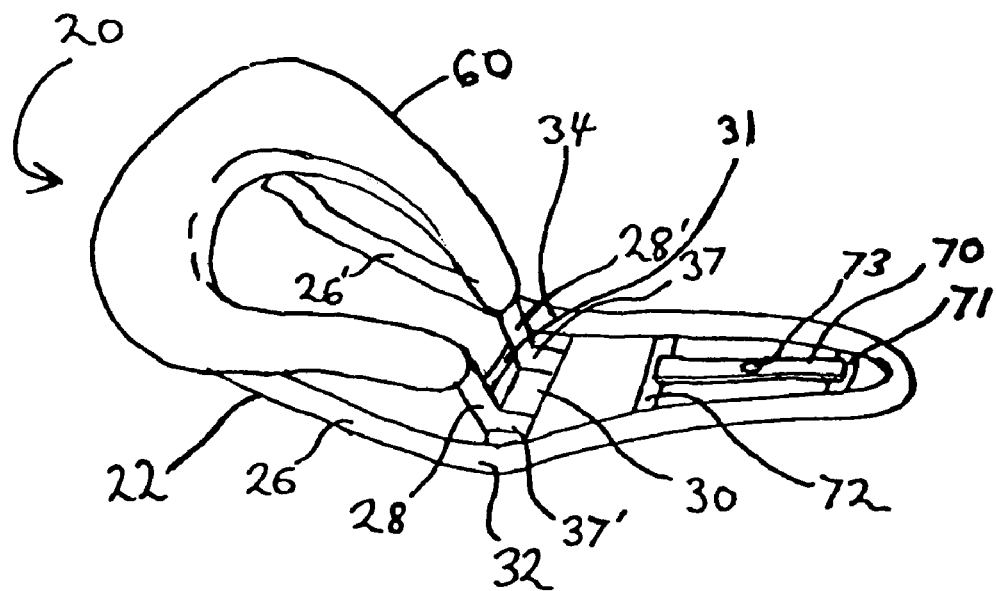
FIG. 5 is a top perspective view of another embodiment of the present invention.

Turning now to the figures, which describe the preferred embodiments of the present invention, FIGS. 1, 2, 3, 4, and 5 show alternate embodiments of bicycle seat 20 comprising primary support frame 22 and secondary suspension frame 24 (not shown in FIG. 5). Primary support frame 22 comprises rails 32 and 34 and may comprise any number of bars.

Primary support frame 22 is attachable to a bicycle seat post system (not shown) in any manner known in the art. In the preferred embodiment shown in the figures, primary support frame 22 attaches to a seat post clamp system typical in the art (not shown) at, for example, seat post attachment areas 26, 26'.

As shown in FIGS. 1, 2, 3, and 4, secondary suspension frame 24 preferably comprises one or more bars. In the embodiment shown in FIG. 1, secondary suspension frame 24 comprises two bars. In the embodiment shown in FIG. 2, secondary suspension frame 24 comprises one bar forming a loop structure. Both embodiments show bar ends 28, 28' that are preferably pivotally attached to support frame shaft 30 of primary support frame 22. Shaft 30 is connected to rail 32 and rail 34. Secondary suspension frame 24 may be attached to shaft 30 in any manner known in the art such as, for example, utilizing a hinged connection means (not shown).

Preferably, bar ends 28, 28' attach to shaft 30 via right swivel attachments 36, 36'. Swivel attachments 36, 36' may be of any type known in the art that provide for a swivel or pivot movement about shaft 30 including, but not limited to, bushings and cams. It is understood that, although the preferred embodiment shows bar ends 28, 28' independently attached to shaft 30, any manner of attachment known in the art that provides for the rear of secondary suspension frame 24 to freely move toward, and away from, primary support frame 22 may be utilized. For example, in another embodiment, bar ends 28, 28' may be joined together at a point (not shown), prior to being commonly, rather than independently, attached to shaft 30. In another embodiment, suspension bar link 31 (shown in FIG. 3) is utilized to join bar ends 28, 28' so that lateral stability is enhanced. In yet another embodiment, bar ends 28, 28' may be replaced with a single plate (not shown) upon which seat pad 60, or a rigid underside (not shown) of seat pad 60 itself, may replace secondary suspension frame 24.

In the embodiment shown in FIG. 5, seat pad 60 comprises a substantially rigid structure (not shown) of the type typical in the art so that secondary suspension frame 24 is not utilized. Seat pad 60 comprises ends 28, 28' to attach seat pad 60 to shaft 30 at points 37, 37' in a non-pivotal manner. Although shaft 30 is shown, it is understood that seat pad 60 may be attached to primary support frame 22 in any manner known in the art). In this embodiment, seat pad 60 is suspended above primary support frame 22 and may move in a spring-like manner above primary support frame 22. Utilizing seat pad 60 in lieu of secondary suspension frame 24 may done any embodiment.

As shown in FIGS. 1, 2, 3, and 4, a suspension system may be incorporated and disposed between primary support frame 22 and secondary suspension frame 24. In the figures, such a suspension system consists of suspension components 50, 50', although any type of suspension system known in the art may be utilized and any number of suspension components may be utilized. Preferably, suspension components 50, 50' are attached to the rear of primary support frame 22 and secondary suspension frame 24 opposite bar ends 28, 28' and are interposed between frames 22 and 24 so that components 50, 50' suspend secondary suspension frame 24 above primary support frame 24. Therefore, in response to load, secondary suspension frame 24 may move toward, and away from, primary support frame 22 in the area about suspension components 50, 50' while bar ends 28, 28' pivot about shaft 30. Suspension components 50, 50' may comprise any suspension means known in the art including, but not limited to, springs, struts, hydraulic dampers, air dampers, gas dampers, elastomers, and combinations thereof. Suspension components 50, 50' may similarly be disposed between seat pad 60 and primary support frame 22 in the embodiment shown in FIG. 5.

Figure 6:
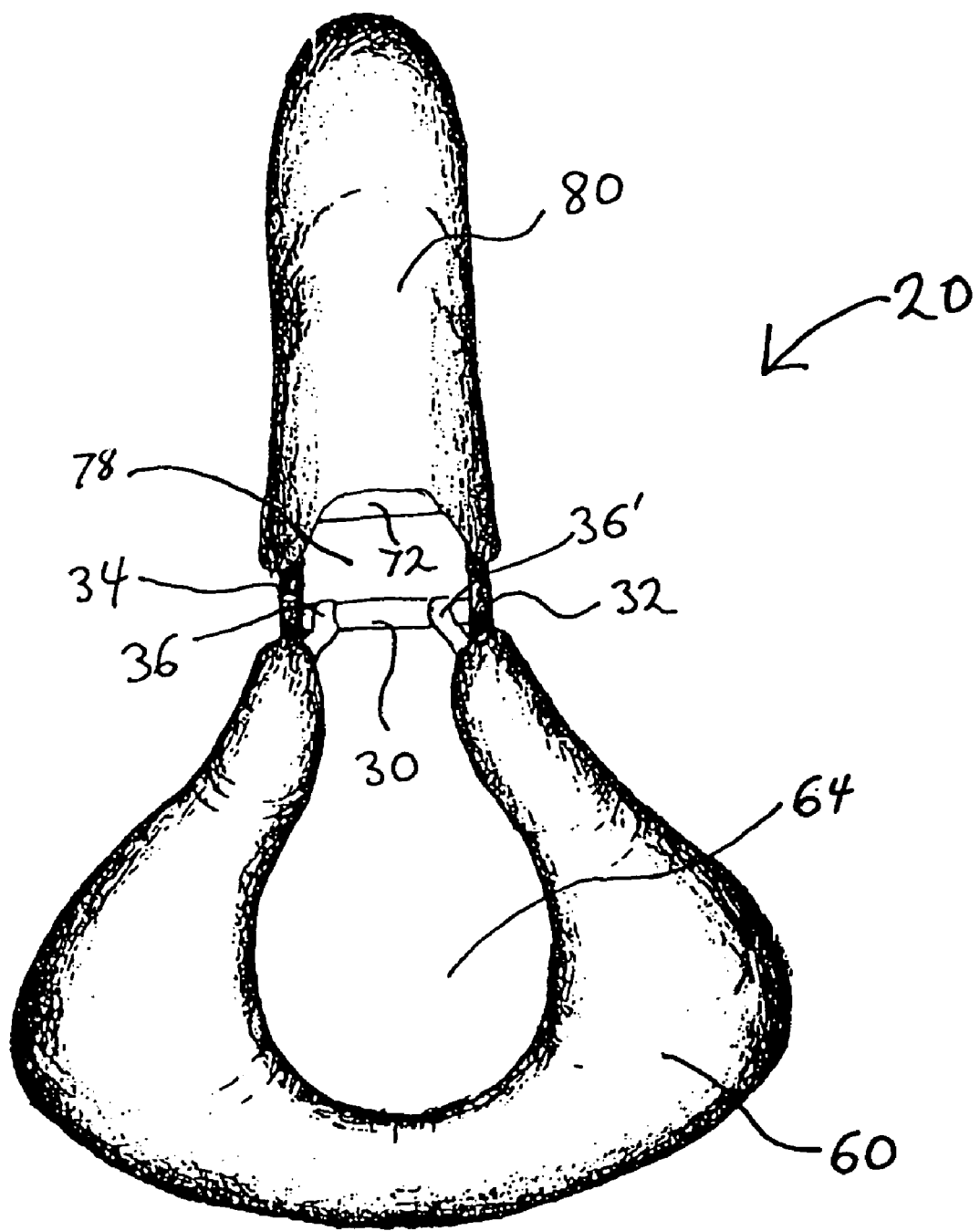
FIG. 6 is a top view of an embodiment of the present invention.
Figure 7:
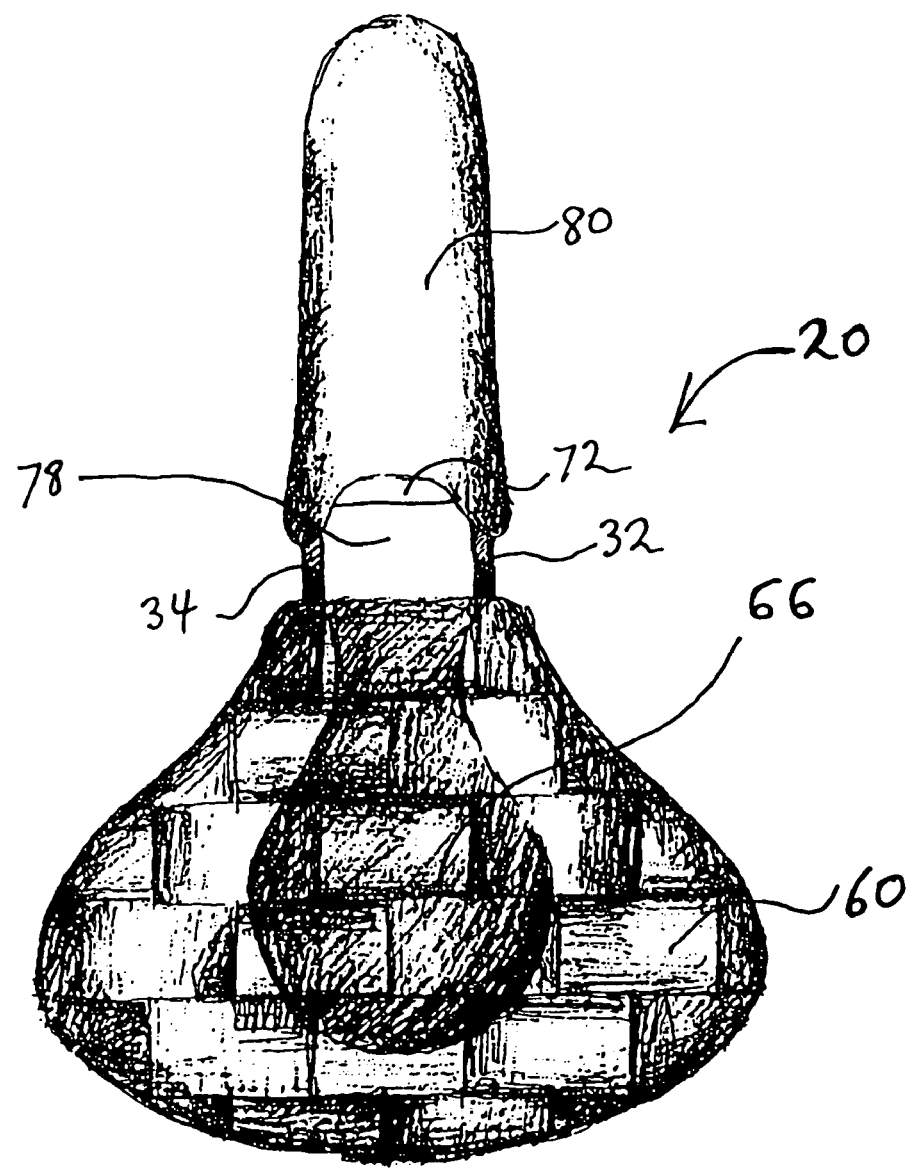
FIG. 7 is a top view of another embodiment comprising interwoven material.

Seat pad 60 may be a simple structure upon which a rider sits, may comprise padding material 62, or may comprise any material capable of providing a comfortable surface upon which a rider may sit. Seat pad 60 is disposed on secondary suspension frame 24. FIG. 6 shows a top view of the preferred embodiment. Preferably, seat pad 60 comprises an arcuate shape with center opening (or open area) 64. In effect, the arcuate shape with center opening 64 forms an open, padded ring upon which a rider may sit comfortably. In the embodiments shown in FIGS. 1, 2, 3, and 4, seat pad 60 is disposed on secondary suspension frame 24 so that center opening 64 results within the periphery of secondary suspension frame 24. In another embodiment shown in FIG. 7, the span of center opening 64 may be covered by flexible material 66. Material 66 may comprise any strong yet flexible material including, but not limited to, vinyl, leather, nylon, and Kevlar®. Material 66 preferably comprises interwoven strips as shown in FIG. 7. Seat pad 60 may be disposed upon secondary suspension frame 24 in any number of ways including, but not limited to, attaching pad 60 so that the most of the upper surface of secondary suspension frame 24 makes contact with the underside of seat pad 60 or attaching seat pad 60 so that only the rear end of secondary suspension frame 24 and the areas at or adjacent to bar ends 28, 28' make contact with seat pad 60. Secondary suspension frame 24 may be attached to, or be an integral part of, the underside of seat pad 60.

The rear of nose pad 80 preferably comprises a U-shaped or concave rear end to form gap 78 and provide a rider with relief from any pressure normally exerted on a rider when a rider positions directly above the area between a conventional nose and seat pad. Therefore, void area 64 and gap 78 form a continuous open, void space.

In the preferred embodiment, nose pad 80 is adjustable as it is movable horizontally in a forward and rearward direction. Any means or method known in the art may be utilized to easily accomplish such movement in any of the embodiments without the use of tools, or with a minimal use of tools, and is not limited to the means depicted herein. As shown in FIG. 6, primary support frame 22 preferably comprises nose rail 70 disposed in parallel orientation between primary support frame rails 32 and 34. Nose rail 70 is preferably attached from one end to the front of primary support frame 22 at the point where rails 32 and 34 meet, or alternatively to first primary support frame bar 71, and from the other end to second primary support frame bar 72. Both bars 71 and 72 are connected from one end to rail 32 and from an opposite end to rail 34. Preferably, nose pad rail 84 is attached to the underside 82 of nose pad 80.

Figure 9:
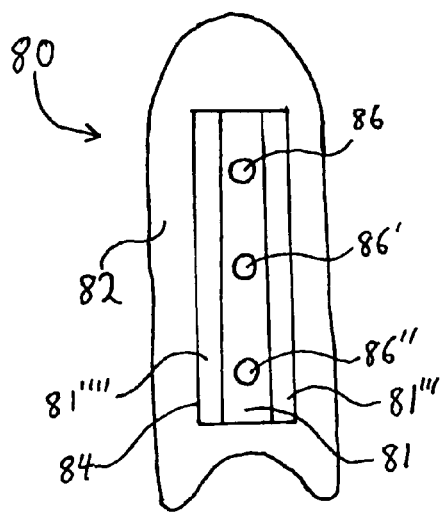
FIG. 9 is a bottom view of the nose pad of the preferred embodiment.
Figure 10:
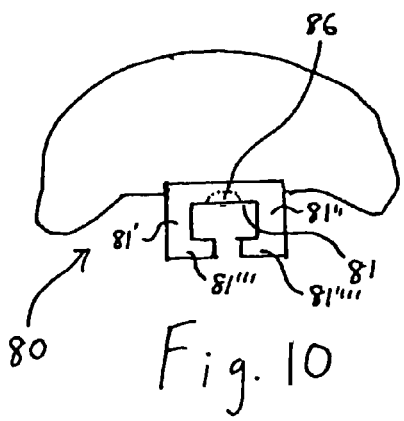
FIG. 10 is a rear view of the nose pad of FIG. 9.
Figure 11:
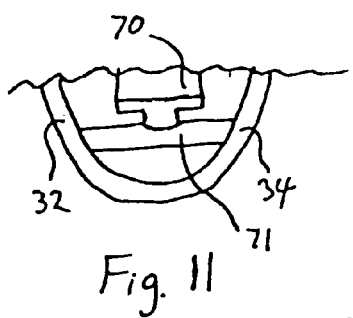
FIG. 11 is a top perspective view of the center nose rail of the preferred embodiment.

As shown in FIG. 9, nose pad rail 84 runs longitudinally along, and preferably most of, the length of nose pad 80 and, as shown in FIG. 10, has a cross section comprising five walls 81, 81', 81", 81'", and 81'''' to wrap around nose rail 70. As shown in FIG. 11, nose rail 70 preferably comprises a t-shaped cross section to receive and securely hold nose pad rail 84 although nose rail 70 may comprise any geometric shape and nose pad rail 84 may likewise comprise any geometric shape capable of fitting on nose rail 70.

Figure 8:
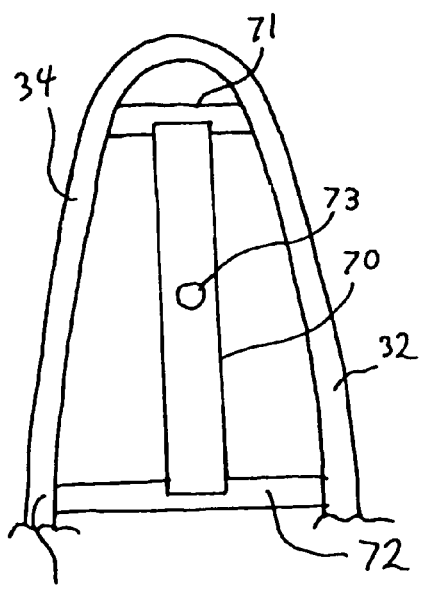
FIG. 8 is a top view of the nose portion of the primary support frame of the preferred embodiment showing the center nose rail.
Figure 12:
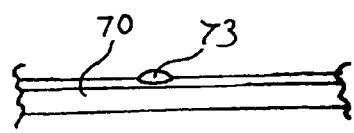
FIG. 12 is a side view of the center nose bar of the preferred embodiment.

As shown in FIGS. 9 and 10, nose pad rail 84 preferably has three or more detents or recesses 86, 86', 86" (although two or more may be utilized) to receive depressible ball 73 (shown in FIGS. 8 and 12) disposed within nose rail 70. Although depressible ball 73 is depicted in the preferred embodiment, any type of insert capable of nesting within detents 86, 86', 86" to secure the position of nose pad 80 may be utilized and any number of such inserts may be utilized. Thus, nose pad rail 84 may slide along the length of nose rail 70 in a forward and rearward direction so that the position of nose pad 80 may be adjusted as desired by a rider (not shown) and secured in two or more positions as dictated by the positioning of ball 73 as it nests into any of detents 86, 86', 86". Therefore, the size of gap 78 may be increased as desired to minimize contact with delicate portions of a rider's body.

As described herein and in the figures, detents 86, 86', 86" are shown disposed in wall 81 opposite the top of nose rail 70 wherein depressible ball 73 is disposed. However, depressible ball 73 (or any insert utilized) and detents 86, 86', 86" may be disposed on any part of nose rail 70 and nose pad rail 84, respectively, (e.g., a side of nose pad rail 84 and of nose rail 70) as long as the functional aspect of depressible ball 73 and detents 86, 86', 86" is retained.

The adjustability of nose pad 80 provides for a change in the size of gap 78 between nose pad 80 and seat pad 60 so that minimal contact is made with a rider's groin area, particularly when a performance rider finds it necessary to lean or move forward on seat 20. The ability to increase the span of gap 78 provides greater comfort without sacrificing the stability provided by nose pad 80 to a rider such as, for example, when a rider finds it necessary, in typical fashion, to stand on pedals and use nose pad 80 to brace against with the inner thighs in order to stabilize the rider's stance. It should also be apparent that, given the ability of nose pad 80 to move forward and rearward, nose pad 80 may be attached to frame 24 so that nose pad 80 may be moved forward until it comes off of frame 24, thereby leaving only the front of frame 24 so that a rider makes very little contact, if any, with frame 24 except to use the front of frame 24 to brace against when necessary. In such an embodiment, limited padding may be disposed about the nose section of bars 32, 34 to provide a rider with better grip and comfort.

The frame, bar, and shaft materials utilized in the present invention may be of any rigid and strong material including, but not limited to, hollow or solid steel, chromoly steel, aluminum, titanium, carbon fiber, other metals, and combinations thereof.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A bicycle seat comprising:
    a primary support frame attachable to a seat post, said frame comprising at least two frame rails oriented substantially parallel to each other;
    a secondary suspension frame attached from a front end to said primary support frame;
    a seat pad disposed on said secondary suspension frame, said seat pad comprising an arcuate shape with a center opening, said seat pad oriented so that a gap in a periphery of said arcuate shaped seat pad is at a front end of said seat pad; and
    a nose pad disposed on said primary support frame forward of said seat pad thereby defining a nose gap between said nose pad and said seat pad adjacent said gap in said periphery so that said nose gap, said periphery gap and said center opening form a continuous open area, said nose pad being adjustably movable forward and rearward to vary a length of said continuous open area.

2. The seat of claim 1 wherein said primary support frame comprises a support frame shaft, said shaft attached from one end to a first of said frame rails and from an opposite end to a second of said frame rails and providing a point of attachment for said secondary suspension frame to said primary support frame.

3. The seat of claim 1 wherein said secondary suspension frame is pivotally attached from a front end to said primary support frame.

4. The seat of claim 1 wherein said secondary suspension frame comprises at least one suspension bar.

5. The seat of claim 1 further comprising at least one suspension component disposed at one end on said secondary suspension frame and disposed on said primary support frame at an opposite end so that said suspension component suspends said secondary suspension frame above said primary support frame.

6. The seat of claim 5 wherein said suspension component comprises a component selected from the group consisting of a spring, a strut, an elastomer, a cushion, a hydraulic damper, a gas damper, an air damper, and a combination thereof.

7. The seat of claim 1 wherein said gap is open with no material extending across and above said gap from said nose pad to said seat pad.

8. The seat of claim 1 wherein said nose pad comprises a concave surface.

9. The seat of claim 1 wherein said nose pad comprises a U-shaped rear end adjacent said nose gap.

10. The seat of claim 1 further comprising a center nose rail disposed in parallel orientation to, and between, said frame rails, said nose rail providing a point of attachment for said nose pad and a platform upon which said nose pad is movable forward and rearward.

11. The seat of claim 10 further comprising a nose pad rail fixed to an underside of said nose pad and attachable to said nose rail.

12. The seat of claim 11 wherein said nose pad rail comprises a depressible insert and wherein said nose rail comprises at least two detents to receive said depressible insert as said nose pad is adjustably moved forward and rearward.

13. The seat of claim 10 wherein said nose pad is easily removable from said nose rail independently of said seat pad.

14. The seat of claim 1 wherein said secondary suspension frame is integral to said seat pad.

15. The seat of claim 1 further comprising a flexible material spanning said center opening in said arcuate shaped seat pad.

16. The seat of claim 15 wherein said flexible material comprises a plurality of interwoven strips.

17. The seat of claim 15 wherein said flexible material comprises a material selected from the group consisting of vinyl, leather, nylon, aramid nylon, and combinations thereof.

18. A bicycle seat comprising:

a support frame attachable to a seat post;

a seat pad disposed on said support frame, said seat pad comprising an arcuate shape with a center opening, said seat pad oriented so that a gap in a periphery of said arcuate shaped seat pad is at a front end of said seat pad; and a nose pad disposed on said support frame forward of said seat pad thereby defining a nose gap between said nose pad and said seat pad adjacent said gap in said periphery so that said nose gap, said periphery gap, and said center opening form a continuous open area, said nose pad being adjustably movable forward and rearward to vary a length of said continuous open area.

* * * * *